INVENTOR
Walter Kohlhagen
BY
Attorney.

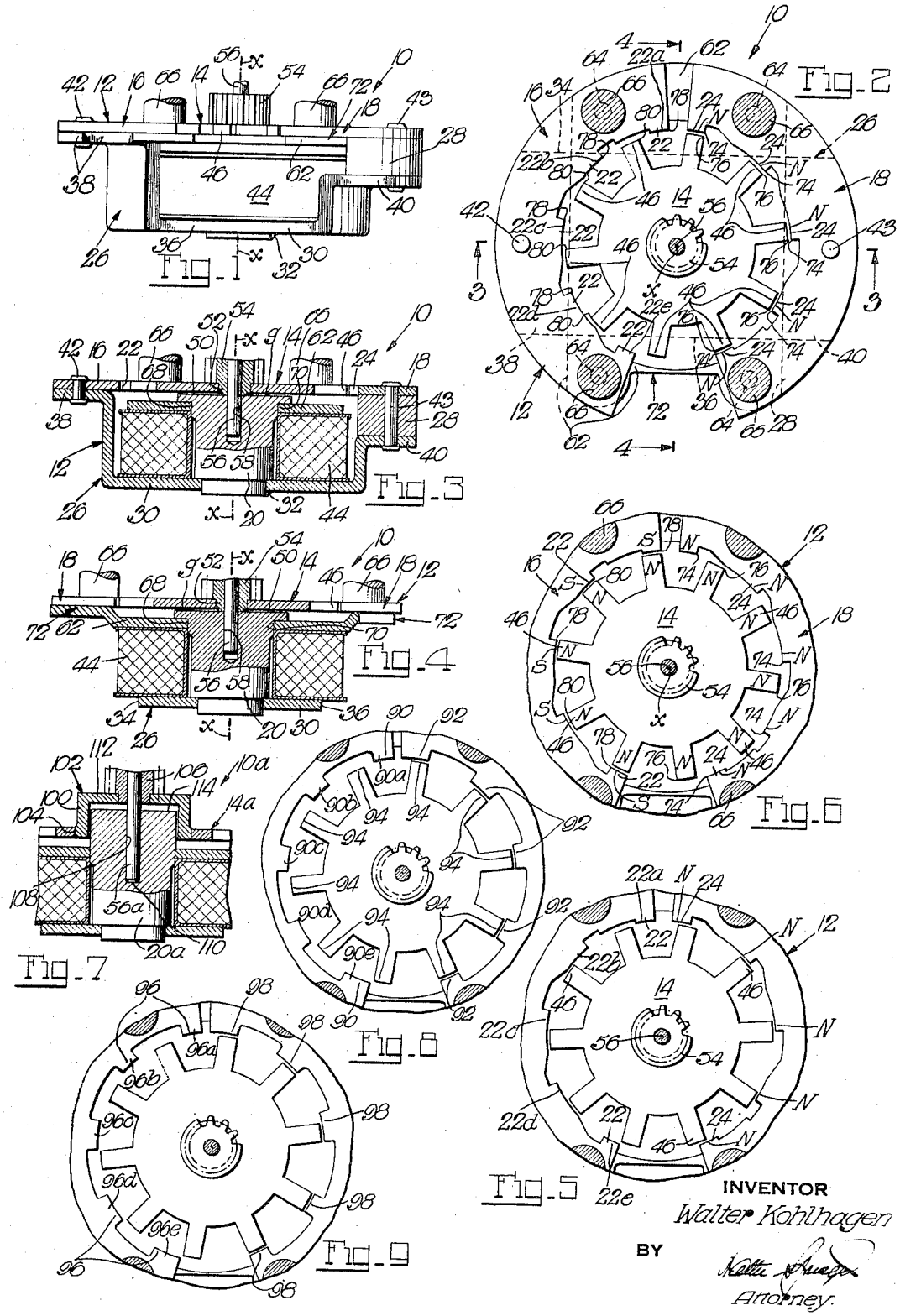

United States Patent Office 3,423,617
Patented Jan. 21, 1969

3,423,617
PULSE-RESPONSIVE STEPPING MOTOR
Walter Kohlhagen, 818 Oakley Ave.,
Elgin, Ill. 60120
Continuation-in-part of application Ser. No. 550,756,
May 17, 1966. This application Feb. 13, 1968, Ser.
No. 715,455
U.S. Cl. 310—49      19 Claims
Int. Cl. H02k 37/00

ABSTRACT OF THE DISCLOSURE

There is provided in a stepping motor a ferromagnetic rotor with poles, two ferromagnetic field plates with poles in cooperative relation with the rotor poles, and ferromagnetic connections between the rotor and plates for establishing magnetic circuits across the rotor and respective field plates. These connections include a core which provides a flux path for both circuits and on which the rotor turns, with the reluctance between rotor and core being substantially constant in any rotor position. One of the magnetic circuits includes a permanent-magnet remote from the core for supplying the operating flux, and the other magnetic circuit includes a coil for generating the operating flux on coil energization, with this coil surrounding the core.

---

This invention relates to stepping motors in general, and to pulse-responsive stepping motors in particular.

This application is a continuation-in-part of my prior application, Ser. No. 550,756, now abandoned, filed May 17, 1966, which is a division of my prior application, Ser. No. 359,629, filed Apr. 14, 1964, now Patent No. 3,271,599.

The type of stepping motor with which the present invention is concerned has a rotor member with poles and at least two field plate members with poles in cooperative relation with the rotor poles, and ferromagnetic connections between these members for establishing magnetic circuits across the rotor member and respective field plate members, of which one circuit includes a permanent magnet for supplying the operating flux, and the other circuit includes a coil for generating the operating flux on current passage through the coil. Thus, the one circuit is permanent with the magnet continuously producng a magnetomotive force, and the other circuit is electromagnetic with flux flowing only on energization of the coil. The polar coordination in this type of motor is arranged to achieve magnetic lock-in of the rotor poles with the field poles in the permanent circuit when the other circuit is interrupted, and attraction of the rotor poles to, and also contemplated simultaneous repulsion from, the field poles in the respective electromagnetic and permanent circuits when the coil is energized for compelling the rotor through a first major phase of an operative step thereof, with the rotor concluding its final phase of the step when on coil deenergization the rotor poles are attracted to, and move into magnetic lock-in with, the field poles in the permanent circuit. While motors of this type are operational, their torque production for stepping a load is relatively low and in any event inadequate for many contemplated applications for which they would otherwise be highly desirable. This is due to the fact that the reluctance between the flux-passing core and the rotor thereon varies widely with different rotor positions and the reluctance between the rotor and field poles is also high.

It is the primary aim and object of the present invention to provide a motor of this type which produces starting and stepping torque that is of considerably higher magnitude than that of prior motors of this type.

It is also among the objects of the present invention to provide a motor of this type which produces the aforementioned high starting and stepping torque over a particularly wide range of parameters such as field and rotor pole dimensions, permanent-magnet and other materials used in motor and size of permanent magnet.

It is another object of the present invention to provide a motor of this type of which the starting and stepping torque is maintained at the aforementioned high magnitude for maximum efficiency, by making provisions for maintaining the entire rotor at high magnetic potential and at the desired alternate polarities throughout the respective initial and final phases of each step for its maximum reaction with the field poles and, hence, for its maximum torque generation. There thus lies in this emphasis on maintaining the entire rotor at high magnetic potential and at the desired alternate polarities throughout the respective phases of each step one of the important keys in the attainment of high starting and stepping torque.

It is a further object of the present invention to provide a motor of this type which is also of exceedingly simple construction and lends itself to highly efficient and low-cost mass production, with most of the parts being simply blanked from flat stock.

Another object of the present invention is to provide a motor of this type which will produce the aforementioned high starting and stepping torque over a particularly wide range of applied voltage, which is highly important for many applications using battery power.

A further object of the present invention is to provide a motor of this type in which by selective polar arrangements torque of different desired magnitudes may be generated over each part of a step for different drive requirements, including quite substantial torque generation at the very start of a step for good starting when the rotor poles in the permanent magnetic circuit are in alignment with the field poles in the same circuit.

It is another object of the present invention to provide a motor of this type of which the rotor may under substantial load even drop behind in phase and will nevertheless properly step forward even though remaining out of full alignment with the field poles.

Another object of the present invention is to provide a motor of this type in which the polar field plates may be identical flat blanked parts on the flanged top of a simple field cup having a coil-surrounded center core on which the rotor turns about a center axis, with the rotor being preferably also a flat blanked part having the poles at its outermost periphery and being there surrounded by the poles on the opposite field plates, and one of the field plates being in direct engagement with a permanent magnet. With this arrangement, the motor may advantageously be of condensed and largely closed construction for most applications, yet provide for the aforementioned high torque not only by virtue of the torque generation at the outermost circumference of the rotor, but also by the feasibility of providing a relatively large number of cooperating poles in the rotor and surrounding field plate set-up. Further, and even more important, particularly high torque generation ensuing from the aforementioned high magnetic potential and the desired alternate polarities of the rotor throughout the respective phases of each step is readily achieved, for the initial phase of each step by locating the rotor close to the high-potential coil end of the center core and providing for minimum magnetic reluctance between the rotor and either field plate, and for the final phase of each step by providing for close magnetic coupling between the rotor poles and field poles in the permanent circuit.

A further object of the present invention is to provide a motor of this type with an alternative polar arrangement in which the field poles of each field plate extend completely around the rotor, with the number of field poles of these plates being the same and successive field poles of one plate alternating with successive field poles of the other plate around the rotor. With this arrangement, the rotor will for each complete revolution advance a number of complete steps which is equal to the number of field poles of either plate, and the rotor may have a number of poles equal to or fewer than the field poles of either plate. One of the advantages of this arrangement is that each rotor pole is in the final phase of each step attracted to a field pole, and all field poles are active poles in each rotor step when the rotor has the maximum number of poles equal to the number of field poles of each plate. Also, the magnetic forces acting on the rotor poles throughout each complete step of the rotor are advantageously balanced evenly around the rotor periphery. Moreover, the field poles of each plate or of both plates may be of the same peripheral width, and rotor torque generation of equal or different magnitudes over different parts of a rotor step and/or stepping of the rotor in a given direction may readily be achieved by appropriate formation of the rotor poles.

Another object of the present invention is to provide a motor of this type of which the field plates are carried by the aforementioned field cup through intermediation of a mounting plate which is accurately located on the center core and secured to the cup. With this arrangement the field plates are on the mounting plate located accurately not only with respect to each other but also with respect to the rotor whose rotary axis is readily made coincident with the axis of the center core, whereby the polar coordination of the field plates and rotor in all respects is kept at optimum accuracy and entirely unaffected by any, and even wide, tolerances in size and/or shape of the field cup. Moreover, the mounting plate may be made of any non-magnetic but electrically conductive material, such as aluminum, for example, to absorb a good deal of the energy generated in the field coil on each current interruption and thereby reduce sparking at the make-and-break contacts.

Further objects and advantages will appear to those skilled in the art from the following, considered in conjunction with the accompanying drawings.

In the accompanying drawings, in which certain modes of carrying out the present invention are shown for illustrative purposes:

FIG. 1 is a side view of a stepping motor embodying the present invention;

FIG. 2 is a top view, partly in section, of the same motor;

Figure 11:
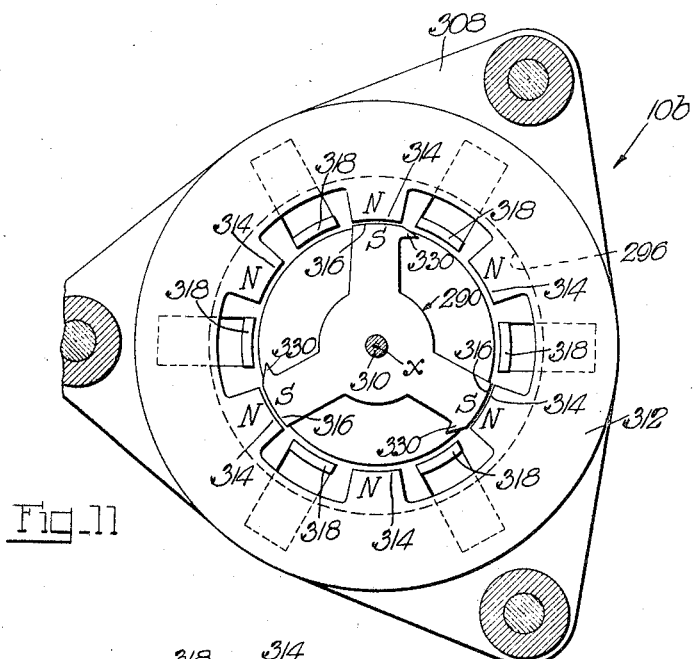
Figure 10:
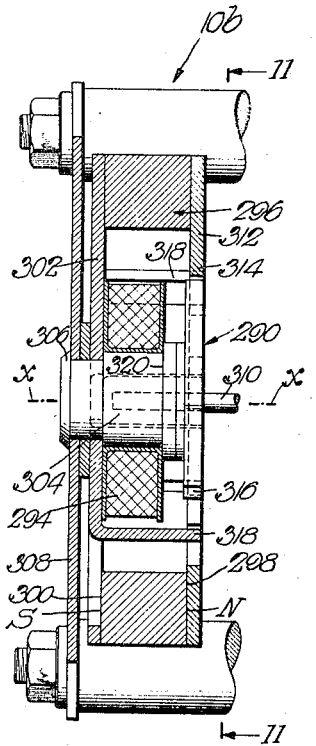
Figure 12:
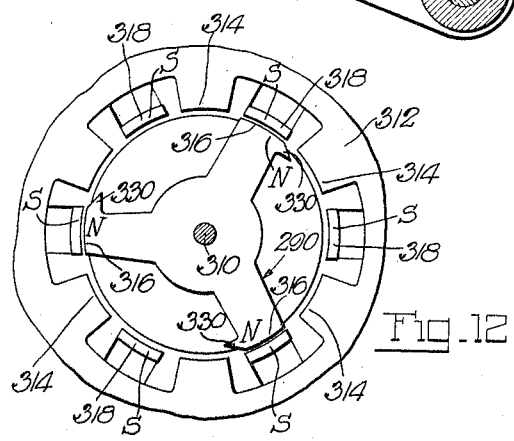
Figure 14:
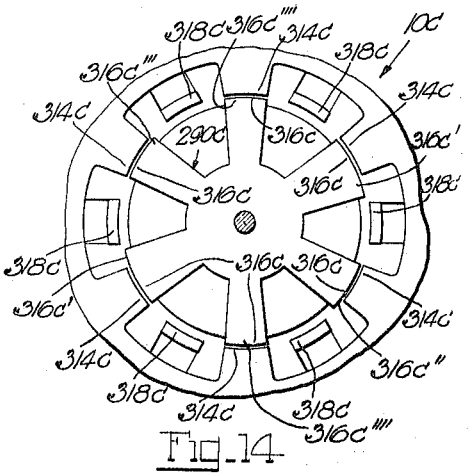
Figure 13:
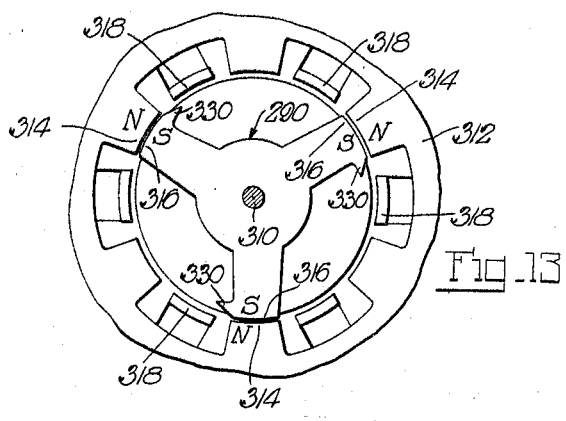
Figure 15:
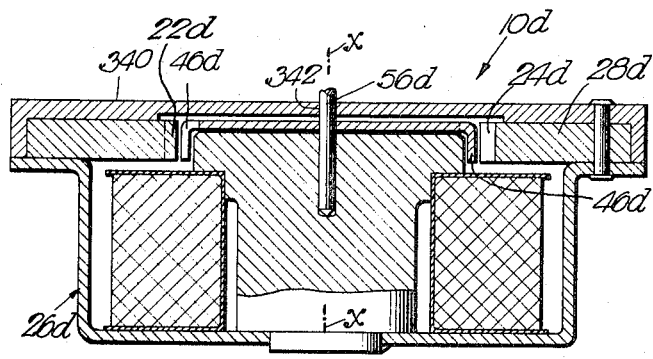

FIGS. 3 and 4 are sections through the motor taken substantially along the lines 3—3 and 4—4, respectively, of FIG. 2;

FIGS. 5 and 6 are fragmentary top views of the rotor similar to FIG. 2, but showing a rotor element of the motor in different operating positions;

FIG. 7 is a fragmentary section through a stepping motor embodying the present invention in a modified manner;

FIGS. 8 and 9 are fragmentary top views of stepping motors embodying the invention in further modified manner;

FIG. 10 is a fragmentary section through a stepping motor embodying the present invention in another modified manner;

FIG. 11 is a section through this modified motor as taken on the line 11—11 of FIG. 10;

FIGS. 12 and 13 are fragmentary motor views similar to FIG. 11, but showing a rotor element of the motor in different operating positions;

FIG. 14 is a fragmentary view of a stepping motor embodying the present invention in a further modified manner; and FIG. 15 is a cross-section through a stepping motor embodying the present invention in still another modified manner.

Referring to the drawings, and more particularly to FIGS. 1 to 4 thereof, the reference numeral 10 designates a stepping motor having a field 12 and a rotor 14. The field 12 provides in this instance two ferromagnetic field plates 16 and 18, a ferromagnetic core 20 and magnetic flux paths between the core 20 and respective field plates 16 and 18.

The field plates 16 and 18 are in this instance formed with sets of field poles 22 and 24 which are arranged circularly about an axis $x$ that is also the rotary axis of the rotor 14. The magnetic flux paths between the core 20 and respective field plates 16 and 18 are formed in this instance by a ferromagnetic field cup 26 and also by a permanent magnet 28. The core 20, which is centered on the axis $x$, is mounted in the field cup 26 at the bottom 30 thereof and is preferably staked thereto as at 32 (FIGS. 1 and 3). The field plates 16 and 18 are carried by the field cup 26 at the top thereof on opposite sides of the axis $x$, with the permanent magnet 28 being in this instance interposed between the field plate 18 and field cup 26, although it is fully obvious to make the field plate 18 with its poles 24 the permanent magnet. The field cup 26 is in this instance cut away on opposite sides as at 34 and 36 (FIGS. 1, 2 and 4) so as to be in the form of a field strap having at its top outwardly extending endflanges 38 and 40 of which endflange 40 is axially nearer the strap bottom 30 than is the other endflange 38 (FIGS. 1 and 3). The field plates 16 and 18 are secured to the endflanges 38 and 40 of the field strap by suitable fasteners 42 and 43, with the permanent magnet 28 being interposed between field plate 18 and the lower endflange 40 so that both field plates 16 and 18 are axially on the same level (FIG. 3). Also included in the field 12 is a field coil 44 which is arranged in the field strap 26 in surrounding relation with the center core 20.

The rotor 14 is in this instance a ferromagnetic plane disc having on its outer periphery poles 46 which cooperate with the field pole sets 22 and 24, with all poles being coordinated in a manner described hereinafter for rotor stepping on each energization and deenergization of the field coil 44. The rotor 14, which is mounted for rotation about the axis $x$, is in sufficiently close proximity to the center core 20 to form a continuing flux path therewith in magnetic circuits across the rotor 14 and respective field plates 16 and 18. Thus, the flux path of one magnetic circuit is from the permanent magnet 28 via field strap 26, center core 20, rotor 14 and field plate 18 back to the magnet 28, with this circuit being permanently closed owing to continuous flow therein of flux emanating from the permanent magnet 28. The flux path of the other circuit is via the other field plate 16, rotor 14, center core 20 and field strap 26 back to the field plate 16, with this circuit being an electromagnetic circuit which is closed on coil energization and otherwise interrupted.

The rotor poles 46 are in this instance equi-angularly spaced and also of equal peripheral width. The sets of field poles 22 and 24 are coordinated with each other in the exemplary manner shown in FIG. 2, with the main characteristic of their coordination being that the field poles of either set 22 or 24 are in full register with their nearest rotor poles 46 while the field poles of the other set are out of full register with their nearest rotor poles 46 to such an extent that the rotor 14 will on the next coil energization and deenergization step clockwise from the exemplary position in FIG. 2 to the exemplary position in FIG. 6 and back again to the position in FIG. 2. Thus, assuming that the polarity of the field poles 24 in the described permanent circuit is N as indicated in FIG. 2, the induced polarity of their nearest rotor poles 46 is then S when the described electromagnetic circuit is interrupted, wherefore these rotor poles will be attracted into full register with the field poles 24 (FIG. 2). Now, on passing DC current through the field coil 44, and on first arranging this coil to induce on energization S polarity in the field poles 22 in the electromagnetic circuit, the rotor poles 46 cooperating with the field poles 22 will assume N polarity in the same electromagnetic circuit and, hence, be attracted clockwise to their nearest field poles 22 from the position in FIG. 2 to the interim position in FIG. 6, with this initial rotor step from the position in FIG. 2 to the position in FIG. 6 being unfailing for a reason, and owing to provisions, to be explained to impress substantially the entire rotor 14, including all of its poles 46, with the same N polarity on closure of the electromagnetic circuit. The rotor 14 will thus remain in the interim position of FIG. 6 while the field coil 44 remains energized. However, as soon as the coil 44 is deenergized and the electromagnetic circuit interrupted in consequence, the permanent circuit will solely take over and by the then induced S polarity in the rotor poles 46 nearest the field poles 24 of N polarity attract these rotor poles into full register with the field poles 24 with ensuing final clockwise stepping of the rotor from the position in FIG. 6 to that in FIG. 2. Unidirectional, in this example clockwise, stepping of the rotor 14 is achieved by appropriate unbalanced arrangement of the field poles 22 and 24. It also follows from the preceding that an operational step of the rotor 14 is divided into two intermittent steps, namely an initial step or phase on coil energization and a final step or phase on coil deenergization.

In accordance with one important aspect of the present invention, and as already described, the field coil 44 is, significantly, placed around the center core 20 which is a flux path common to both magnetic circuits. However, in thus placing the coil 44 around the center core 20, substantially the entire, high-potential, core end 50 so close to the coil 44 will assume the same singular polarity therein induced by this coil when energized, with this polarity being then N in the example given. Accordingly, in thus providing the field coil 44 directly on the center core 20, the flux flow through the core in consequence of energization of the coil will even at fairly low amperewindings of the latter sufficiently dam the flux flow through this core emanating from the permanent magnet 28 to achieve substantially throughout the core end 50 the singular coil-induced polarity. In addition, with this arrangement, the magnetic potential of the core end 50 from the energized field coil is quite high.

In accordance with another important aspect of the present invention, the center core 20 and rotor 14 are coordinated so that the magnetic reluctance between them is sufficiently low to compel substantially the entire rotor, including all of its poles 46, to assume the singular coil-induced polarity of the core end 50 and also be of substantially the same high magnetic potential as the latter when the coil is energized. Preferably and for best results, the magnetic reluctance between the center core and rotor is kept at less than the reluctance between the rotor 14 and either set of field poles 22 or 24. This is achieved in this instance by dimensioning the center core 20, and particularly its end 50, so that its cross-sectional area is quite substantial, and by keeping an equally substantial surface area of the rotor 14 spaced from the core end 50 by a minimal gap g. In the present instance, the rotor 14 is secured to a shank 52 of a drive pinion 54 on a shaft 56 which is journalled in a bearing 58 in the center core 20 (FIGS. 3 and 4), with a reduced part of the pinion shank 52 resting and running on the center core to maintain the minimal gap g between the core end 50 and rotor 14.

It has already been pointed out that, owing to the provision of the field coil 44 directly on the center core 20 and arrangement of substantially constant and low magnetic reluctance between core and rotor in any rotor position, the entire rotor has on coil energization the singular coil-induced polarity and also high magnetic potential of the core end 50. While this has the immediate result of quite forceful attraction of rotor poles to the nearest field poles 22, it also gives rise at the other field poles 24 and therewith coordinated rotor poles to either one of three manifestations depending on parameters, including applied voltage. In one of these manifestations, the rotor poles magnetically decouple from the adjacent field poles 24 of exemplary N polarity induced by the permanent magnet, with the result that these field poles 24 do not effectively impede the attraction of the other rotor poles to the adjacent field poles 22. This may occur especially when the magnetic potential of the rotor poles is more or less like the magnetic potential of the field poles 24. Decoupling under these conditions will occur particularly readily because the rotor potential, being substantially at that of the adjacent core end, will especially on alignment of the rotor poles with the field poles 24 compel a decrease in the permanent-magnet flux and its density and thereby effect the decoupling at a minimum coil excitation level. Another manifestation is repulsion of the rotor poles from the adjacent field poles 24 of permanent polarity, with such repulsion being additive to the attraction of the other rotor poles to the field poles 22 in producing rotor torque. This may occur when the magnetic potential of the rotor poles is somewhat higher than that of the field poles 24. The third and last manifestation is flux flow from the rotor poles to the therewith aligned field poles 24, which may take place when the magnetic potential of the rotor poles is considerably higher than that of the field poles 24, in which case flux from these rotor poles will flow into these field poles and drive the flux in the latter from the permanent magnet backwards to some extent. While this has a tendency to impede the forward progress of the rotor, this impeding tendency is quite weak and to all practical intents and purposes negligible, because there are opposing fluxes and flux flow from the rotor poles to the field poles 24 is in consequence relatively small, whereas the rotor poles and other field poles cooperating therewith, being of opposite polarity and also of high magnetic potential as aforementioned, will produce effective rotor torque of particularly large magnitude. The common cause of either one of these manifestations is, of course, the set-up of opposing magnetic fields at the field poles 24 and at the adjacent rotor poles.

It thus follows from the preceding that the rotor torque generation for each initial phase of an operational rotor step, i.e., from the rotor position in FIG. 2 to that of FIG. 6, is quite high for the electrical energy input, and is entirely adequate to drive the motor load and also overcome the added load of friction and inertia in this initial phase of a complete rotor step. The rotor torque generation for the final phase of each rotor step is also entirely adequate to continue the load drive to the end of the step. Moreover, with ready and appropriate operational make-and-break switch timing for energization and deenergization of the field coil 44, so that the initial phase of each operational rotor step is followed uninterruptedly by the final phase thereof as in many motor applications, the rotor torque generation in this final phase is more than adequate to continue the load drive to the end of the step. Thus, on deenergization of the field coil, the rotor poles then cooperating with the field poles 24 of permanent polarity in the permanent circuit not only assume a polarity opposite to that of these field poles but also have a high magnetic potential even at reasonably low magnetic strength of the permanent magnet 28, wherefore the ensuing attraction of these rotor poles to these field poles is quite high. Moreover, the rotor torque generation during each phase of a rotor step is even enhanced owing to the provision of the rotor pole faces 60 at the outermost circumference of the flat rotor (FIG. 2). Also, owing to the high rotor torque generation, the rotor may under an excessive load even drop behind in phase and will nevertheless correctly step the load even though remaining out of full register with the field poles.

The present motor is also of exceedingly simple construction and lends itself to highly efficient mass production at low cost, yet is highly reliable and accurate in its performance. Thus, most of the motor parts are blanked from flat stock and require no further finishoperation. This is true of the field plates 16 and 18 and also of the rotor 14. The field strap 26 is preferably also a blanked part which is given its final shape in the same die operation. The center core 20 is preferably an inexpensive mass production part made in an automatic screw machine. The coil 44 and exemplary crescent-shaped permanent magnet 28 may also be kept simple and at low cost. The assembly of these parts may readily be undertaken in simple and highly efficient mass production fashion without requiring close tolerances either in the size or shape of these parts or in their assembly, yet without sacrificing high accuracy of the correct coordination of the field pole sets with each other and with the rotor poles which is so important for the contemplated high rotor torque generation. It is to the end of permitting such simple and efficient assembly of the motor parts, yet achieving highly accurate polar coordination, that there is provided a simple mounting plate 62 for the field plates 16 and 18. Thus, the field plates 16 and 18 are initially mounted and located on the mounting plate 62 by the shanks 64 of exemplary pillars 66 (FIGS. 1 and 2) which may serve as supports for another part (not shown). More particularly, the field plates 16 and 18 are mounted on the plate 62 in accurate coordination with each other, and they are also mounted thereon in accurate coordination with the rotor axis $x$ by virtue of the provision in the mounting plate 62 of an aperture 68 which on assembly of this plate with the center core 20 closely fits around a peripheral core part 70 that is machined with reference to the shaft bearing 58 in the center core and, hence, with reference to the rotor axis $x$. Thus, on preassembly of the mounting plate 62 with the field plates 16 and 18 into a unit 72, this unit and the rest of the motor parts may be finish-assembled without affecting the accurate coordination of the field poles 22 and 24 with each other and also with the rotor axis and, hence, with the rotor poles, this despite tolerances in size or shape, or in finish-assembly, of the motor parts. Once the unit 72 is preassembled and further assembled with the center core 20, the highly accurate polar coordination is not even affected by the securement of the field plate 16 and of the other field plate 18 and permanent magnet 28 to the respective strap endflanges 38 and 40 at 42 and 43 which serves the purpose of maintaining contact between these parts and also for mounting the unit 72 on the field strap 26. The mountnig plate 62 may also be a simple blanked part, with the same being blanked and the aperture 68 and holes for the pillar shanks 64 preferably punched therein in the same die operation. The mounting plate 62 is of any suitable non-magnetic material to prevent magnetic short-circuiting of the field plates 16 and 18 across this mounting plate. Furthermore, this mounting plate is advantageously also of electrically conductive material, such as aluminum, for example, to absorb a good deal of the energy generated in the field coil on each current interruption, thereby to reduce sparking at the make-and-break contacts of the switch (not shown) in the coil circuit.

To achieve sharply defined initial and final phases of each rotor step, i.e., have the rotor 14 advance recurrently into the same precise alternating positions in FIGS. 6 and 2 on successive step phases, at least one field pole of each set 22 and 24 is of the same peripheral width as a rotor pole, with preferably none of the field poles being of smaller peripheral width than a rotor pole, and the field poles of both sets are so spaced that the ends of the field poles of either set which are leading in one direction of rotor rotation, in this instance clockwise in FIGS. 2 and 6, align with the correspondingly leading ends of their nearest rotor poles when the correspondingly leading ends of the field poles of the other set are out of alignment with the correspondingly leading ends of their nearest field poles. This alternate field and rotor pole coordination is shown in FIGS. 2 and 6. Thus, in FIG. 2 the clockwise leading ends 74 of the field poles 24 align with the correspondingly leading ends 76 of the nearest rotor poles while the correspondingly leading ends 78 of the other field poles 22 are out of alignment with the correspondingly leading ends 80 of their nearest rotor poles. FIG. 6 shows the exact reverse condition.

The exemplary field poles 22 and 24 in FIGS. 2 and 6 are further designed for rotor torque generation of different desired magnitudes over different parts of each phase of a rotor step. Thus, it will be noted in FIG. 2 that the clockwise leading field pole 22a and the last field pole 22e are of the same peripheral width, while among the inbetween field poles the field poles 22b and 22c are of progressively larger peripheral width, and the field poles 22c and 22d are of the same peripheral width. The same widthwise relation exists in this instance between the opposite field poles 24. With this arrangement, it will be noted that in the rotor position between successive rotor steps (FIG. 2) the field poles 22c and 22d partly overlap, in this instance equally, their nearest rotor poles, while the field pole 22b is just about to confront its nearest rotor pole, and the remaining field poles 22a and 22e are farther away from their nearest rotor poles. Accordingly, on energization of the field coil and ensuing induced exemplary S and N polarities in the field poles 22 and rotor poles 46 the field poles 22c and 22d will initially attract their nearest rotor poles with equal and considerable force and thus, generate good rotor starting torque. With the powerful rotor-starting attraction of the two rotor poles into fuller register with the respective field poles 22c and 22d the other rotor poles also advance clockwise, so that on such fuller register of the field poles 22c and 22d with their adjacent rotor poles and ensuing reduced torque generation between them (FIG. 5) the next-ahead rotor pole moves then in partial register with the field pole 22b for their optimum rotor torque generation, and when the latter poles are about to move into full register and then produce negligible rotor torque two other rotor poles will then be within partial-register proximity to the endmost field poles 22a and 22e with ensuing high rotor torque generation over a last part of the initial phase of the rotor step and strong pull-in of the rotor into the end position of this phase (FIG. 6). Accordingly, the exemplary arrangement of the field poles 22 produces high rotor starting torque, continuing but lesser intermediate torque and then high end or rotor pull-in torque. With the arrangement of the field poles 24 being preferably identical with that of the field poles 22 as mentioned, the field poles 24 will for the final step phase of the rotor cooperate with their nearest rotor poles in the same manner as described in connection with the other field poles 22 and their nearest rotor poles, i.e., they will produce initial high rotor torque then somewhat lower continuing torque and finally high end or pull-in torque, as will be readily understood. There is, of course, a structural and assembly, and hence also cost, advantage in the identical arrangement of the field poles 22 and 24 and otherwise also identical formation of both field plates 16 and 18.

FIG. 8 shows a stepping motor with a modified field pole arrangement. With both sets of field poles 90 and 92 being arranged identically by preference, the arrangement of only one field pole set need be described. Thus, beginning with the field pole 90a of the same peripheral width as a rotor pole, the succeeding field poles 90b to 90e are of increasingly greater peripheral width, with the result that in an initial step phase of the rotor the rotor torque generated by these field poles and their nearest rotor poles 94 is substantially even throughout this initial step phase. Of course, the same holds true on cooperation between the other field poles 92 and their nearest rotor poles 94 in the final step phase of the rotor.

FIG. 9 shows a stepping motor with a further modified field pole arrangement for producing differential rotor-start and rotor pull-in torque. Thus, among the field poles 96, the two leading poles 96a and 96b are of the same width equal to that of a rotor pole, while the three remaining field poles 96c to 96e are also of the same but greater peripheral width. Accordingly, the rotor has for an initial step phase very high starting torque followed by also high but somewhat less pull-in torque, as will be readily understood. With the other field poles 98 having the same arrangement, the same rotor torque conditions, though of lower torque magnitude, will occur in the final step phase of the rotor. In view of the various described field pole arrangements, it is of course, obvious to combine any of their features in still other field pole arrangements to achieve different desired rotor torque conditions during either or both step phases of a rotor.

While in the described motor 10 (FIG. 3) the magnetic attractive forces between the rotor 14 and therefrom closely spaced core end 50 somewhat impede the rotor drive because this core end acts in this instance as a thrust bearing for the rotor owing to its journal support in the center core 20, FIG. 7 shows a modified motor 10a of which the rotor 14a encounters no such impediment in its drive, yet is journalled with its shaft 56a in the center core 20a. Thus, the rotor 14a is provided with an axially projecting annular skirt 100 which over a considerable endlength of the center core is in close surrounding proximity thereto so that the magnetic reluctance between them is very low and preferably less than that between the rotor poles and either set of field poles, all to the end of inducing on closure of the electromagnetic circuit the same singular polarity in the rotor substantially throughout. The annular skirt 100 is in this instance formed by a cup-shaped ferromagnetic part 102 to which the rotor 14a is secured at 104, and to which is also secured a pinion 106 on the shaft 56a that is journalled in a bearing 108 in the center core 20a and extends to the bottom 110 of the journal bearing which serves as a thrust bearing. With the shaft 56a thus resting on the thrust bearing 110, the bottom 112 of the cup-shaped part 102 is spaced from the adjacent core end 114 sufficiently to avoid magnetic attraction between them.

Reference is now had to FIGS. 10 and 11 which show a stepping motor 10b that differs from the described motor 10 of FIGS. 1 and 2 in that the field poles of the respective sets extend completely around the rotor and successive field poles of one set alternate with successive field poles of the other set, with ensuing advantages. The present motor 10b has, besides a field coil 294, a permanent magnet 296 of exemplary ring shape with the opposite pole faces 298 and 300 thereof being of exemplary N and S polarity, respectively (FIG. 10). The magnet 296 is with its face 300 mounted in any suitable manner on a field plate 302 which, in turn, is mounted on a ferromagnetic core 304 that is staked at 306 to an endplate 308, with the core 304 providing a preferably lubricated bearing for a shaft 310 which carries the rotor 290. Suitably mounted on the opposite face 298 of the magnet 296 is another field plate 312 having field poles 314 which cooperate with the pole faces 316 of the rotor 290 and are distributed complete around the rotor. Also adapted to cooperate with the rotor pole faces 316 are additional field poles 318 which are struck from the field plate 302 and bent into parallelism with the rotor axis x. The field poles 318 are also distributed completely around the rotor, and successive field poles 314 alternate with successive field poles 318 throughout.

The rotor 290 has in this instance 3 equiangularly spaced pole faces 316, requiring six field poles 314 and six field poles 318 in order to step the rotor through exemplary 60° for each field coil energization. With the field coil 294 deenergized, the rotor 290 is held in any one of six repose positions in which its pole faces 316 are in alignment with the field poles 314 (FIG. 11). This is due to the fact that the field poles 314 have the permanent polarity of the magnet face 298, in this example N, with which they are linked through the field plate 312, while the rotor pole faces 316 are then of exemplary S polarity owing to their being then magnetically linked to the opposite magnet face 300 of exemplary S polarity via the rotor 290, core 304 and field plate 302.

Assuming now that in the exemplary rotor repose position of FIG. 11 the circuit of the field coil 294 is closed, with the latter being arranged to produce S polarity in the field poles 318 (FIG. 12) and, hence, N polarity in the rotor pole faces 316, and with the rotor pole faces 316 having the extensions 330 toward the clockwise nearest field poles 318 (FIG. 11), the rotor will step through the initial phase. With the rotor thus stepping into the intermediate position in FIG. 12, the field coil 294 is deenergized, whereupon the rotor pole faces 316 revert to S polarity induced by the permanent magnet 296, with ensuing pull or attraction of the rotor into the next repose position (FIG. 13). The rotor is thus stepped in clockwise direction through 60° on each energization of the field coil 294, as will be readily understood.

While in the exemplary modified motor 10b of FIGS. 10 and 11 the rotor poles 316 are fewer in number than the field poles 314 or 318, the modified rotor 10c of FIG. 14 has, for optimum rotor torque generation, the maximum number of rotor pole faces 316c which is equal to the number of field poles 314c or 318c, i.e., six rotor pole faces 316c in the exemplary field pole arrangement of six field poles 314c and six field poles 318c.

One of the advantages of the modified motors 10b and 10c of FIGS. 10, 11 and 14 is that each rotor pole is in its final step phase after coil deenergization attracted to a field pole, and another advantage is that the magnetic forces acting on the rotor poles throughout each phase of a rotor step are balanced evenly around the rotor periphery. Additionally, another important advantage is secured with the exemplary motor 10c of the maximum permissible number of pole faces of the rotor (FIG. 14) in that all field poles are active poles in each rotor step phase pursuant to coil energization, as will be readily understood.

The modified rotor 290c of the motor 10c is further arranged to provide for rotor torque generation of different magnitudes over different parts of a rotor step. To this end, the rotor pole faces 316c are of differential peripheral width, while the field poles 314c and 318c are of identical peripheral width. Thus, in the exemplary pole face arrangement of the rotor 290c (FIG. 14) there are provided two "starting" pole faces 316c' of largest peripheral width which on each start of an initial and final rotor stepping phase in exemplary clockwise direction cooperate with the associated field poles in generating high rotor starting torque. The rotor 290c next provides two "running" pole faces 316c" and 316c''' of progressively smaller peripheral width, though still greater than field pole width, which cooperate with the associated field poles in generating torque of substantially equal magnitude over successive continuing parts of each step phase, with the rotor torque then being of somewhat lower magnitude than at the start of each step phase. Finally, the rotor 290c provides two "lock-in" pole faces 316c'''' of equal and smallest peripheral width which in this instance is equal to the field pole width, with these "lock-in" pole faces cooperating with the associated field poles in generating rotor torque of greater magnitude during the final part of each rotor step phase.

Reference is now had to FIG. 15 which shows a modified motor 10d which differs from the motor 10 of FIGS. 1 to 3 primarily in that the field poles 24d are formed by the permanent-magnet 28d. In this motor, the rotor poles 46d are also formed into extension parallel to the rotor axis x so as to be axially substantially coextensive with the field poles 24d and 22d, and a non-magnetic plate 340 is mounted on top of the field cup 26d to provide an additional bearing 342 for the rotor shaft 56d. This modified motor 10d uses the same general operating principles as the motor 10. However, by combining the field poles 24d and permanent-magnet 28d, this motor has enhanced repulse action between the field poles 24d and adjacent rotor poles 46d in the initial phase of each rotor step.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In a stepping motor, the combination with two sets of field poles arranged circularly about an axis, and a ferromagnetic rotor mounted for rotation about said axis and having poles surrounded by said field pole sets, of flux paths for magnetic circuits across said rotor poles and respective field pole sets, including a core about said axis, with said core and rotor having adjacent end surfaces providing between them constant reluctance in any rotor position, and said core defining a flux path for both circuits, and a permanent magnet in one of said circuits remote from said core and effecting a primary flux flow in one direction through said core; and a flux-producing coil for the other magnetic circuit, with said coil surrounding said core to produce on coil energization a primary flux flow through said core in the direction opposite to said one direction, with ensuing polarization of said entire core end surface and entire rotor at the same polarity as that of the field poles of one set which are polarized by said permanent magnet and further polarization of the field poles of the other set at the opposite polarity, thereby to provide opposing magnetic fields at the field poles of said one set and at the adjacent rotor poles and an enhancing magnetic field across the field poles of said other set and adjacent rotor poles, and said poles being coordinated for rotor stepping on each coil energization and deenergization.

2. The combination in a stepping motor as in claim 1, in which the common area of said adjacent core and rotor surfaces divided by the length of the gap between them is substantially smaller than the common area of the field poles of either set and therewith aligned rotor poles divided by the length of the gap between them, so that the reluctance between said core and rotor is substantially smaller than that between the field poles of either set and therewith aligned rotor poles.

3. The combination in a stepping motor as in claim 1, in which said rotor is flat and lies in a plane normal to said axis, with the rotor poles being formed as the outermost peripheral parts of the rotor, and said flux paths further include two plane ferromagnetic plates forming the respective field pole sets in the plane of said plates.

4. The combination in a stepping motor as in claim 3, in which said ferromagnetic plates are identical with each other.

5. The combination in a stepping motor as in claim 1, in which the field poles of said sets are of equal number, and the overall number of field poles is equal to the number of rotor poles, with the field poles of either set being successive with each other.

6. The combination in a stepping motor as in claim 1, in which the field poles of said one set are formed by said permanent magnet.

7. The combination in a stepping motor as in claim 1, in which said core end is a cylindrical endlength of said core beyond said coil, said rotor has a cylindrical ferromagnetic skirt about said axis surrounding said core endlength in close proximity thereto so that the magnetic reluctance between them is less than that between said rotor poles and either field pole set, and said rotor is otherwise spaced from said core endlength sufficiently to be magnetically substantially uncoupled from the latter in the direction of said axis.

8. The combination in a stepping motor as in claim 1, in which said rotor poles are equiangularly spaced and of the same peripheral width, said field pole sets extend around different peripheral parts, respectively, of said rotor, and the field poles are so arranged that the ends of the field poles of either set which are leading in one direction of rotor rotation align with the correspondingly leading ends of the nearest rotor poles while the correspondingly leading ends of the field poles of the other set are out of alignment with the correspondingly leading ends of the nearest rotor poles, with at least two field poles of each set being of peripheral widths equal to and greater than that of a rotor pole, respectively, so that the rotor will on each coil energization and deenergization step in said one direction.

9. The combination in a stepping motor as in claim 8, in which a plurality of field poles of at least one set are of larger peripheral widths than the remaining field poles of said one set for rotor torque generation of different magnitudes over corresponding parts of a rotor step.

10. The combination in a stepping motor as in claim 8, in which field poles of at least one set succeeding each other in said one direction are of substantially equally decreasing peripheral width, whereby rotor torque generation is of substantially equal magnitude throughout a corresponding part of a rotor step.

11. The combination in a stepping motor as in claim 8, in which a plurality of field poles of at least one set are of different peripheral widths than the remaining field poles of said one set for rotor torque generation of substantially equal magnitude over a part, and of greater magnitude over the remaining part, of a rotor step.

12. A stepping motor, having a ferromagnetic field cup open at the top and closed at the bottom and having a center axis; a ferromagnetic core in said cup about said axis extending from said bottom and having an end remote from said bottom; two ferromagnetic field plates mounted on said cup at the top thereof and having sets of field poles, respectively, arranged circularly about said axis; a ferromagnetic rotor mounted for rotation about said axis and having poles surrounded by said field poles, with said rotor and core having adjacent end surfaces providing between them constant reluctance in any rotor position; a permanent magnet interposed between and in engagement with one of said plates and cup remote from said core and effecting a primary flux flow in one direction through said core; and a flux-producing coil in said cup, with said coil surrounding said core to produce on coil energization a primary flux flow through said core in the direction opposite to said one direction, with ensuing polarization of said entire core end surface and entire rotor at the same polarity as that of the field poles of one set which are polarized by said permanent magnet and further polarization of the field poles of the other set at the opposite polarity, thereby to provide opposing magnetic fields at the field poles of said one set and at the adjacent rotor poles and an enhancing magnetic field across the field poles of said other set and adjacent rotor poles, and said poles being coordinated for rotor stepping on each coil energization and deenergization.

13. A stepping motor as in claim 12, in which said cup is cut away on oposite sides to form a field strap with opposite outwardly-projecting endflanges at the top, of which one endflange is axially nearer the cup bottom than the other endflange, and said field plates being mounted on said endflanges, respectively, with said magnet being interposed between said one endflange and said one field plate.

14. A stepping motor as in claim 12, which further has a non-magnetic plate that is centered on said axis and on which said field plates are mounted and located with respect to said axis, and said field plates and permanent magnet are secured to said cup for permanent engagement with each other.

15. A stepping motor as in claim 14, in which said rotor is carried by a shaft, said core provides a bearing for said shaft centered on said axis, and said non-magnetic plate is located on said core.

16. A stepping motor as in claim 15, in which said non-magnetic plate is electrically conductive and in surrounding engagement with said core.

17. A stepping motor with an axis, having two ferromagnetic field plates with sets of equal numbers of field poles, respectively, with all field poles arranged circularly about said axis and successive field poles of one set alternating with successive field poles of the other set all around said axis; a ferromagnetic rotor mounted for rotation about said axis and having poles surrounded by said field poles; flux paths for magnetic circuits across said rotor and respective field plates, including a core about said axis having an end adjacent and in magnetically coupled relation with said rotor and defining a flux path common to both circuits, and a permanent magnet in one of said circuits and remote from said core for closure of said one circuit; and a field coil surrounding said core and adapted on energization to close the other circuit, with the field pole set therein being then of a polarity opposite to that of the field pole set in said one circuit and substantially said entire core end being then of the singular polarity induced by said other circuit, said poles being coordinated for rotor stepping on each coil energization and de-energization, and said core end being coordinated with said rotor so that the magnetic reluctance between them is sufficiently low to compel substantially the entire rotor to assume on coil energization said singular polarity of said core end.

18. A stepping motor as in claim 17, in which said field plates are axially spaced, said core extends from a first field plate in said other circuit toward the other field plate and has an end remote from said first field plate, and said magnet is ring-shaped and surrounds said coil and is interposed between and in engagement with said field plates.

19. A stepping motor as in claim 17, in which the field poles of each set are equiangularly spaced and of the same peripheral width, the rotor poles are arranged to be in successive rotor positions in full register with field poles of said sets, respectively, and at least one rotor pole is of greater peripheral width than any field pole for rotor stepping in a certain direction.

References Cited

UNITED STATES PATENTS

| | | | |
|---|---|---|---|
| 2,659,853 | 11/1953 | Morrison | 310—49 |
| 2,864,018 | 12/1958 | Aeschmann | 310—49 |
| 3,042,818 | 7/1962 | Busch | 310—49 |
| 3,119,941 | 1/1964 | Guiot | 310—49 |

BENJAMIN DOBECK, *Primary Examiner.*

G. NUNEZ, *Assistant Examiner.*

U.S. Cl. X.R.

310—154, 181